United States Patent
Sly et al.

(10) Patent No.: US 8,948,567 B2
(45) Date of Patent: Feb. 3, 2015

(54) COMPANION TIMELINE WITH TIMELINE EVENTS

(75) Inventors: Matthew Fuller Sly, Jamaica Plain, MA (US); Jeffrey Lupien, Lynnfield, MA (US); Keh-Li Sheng, Jamaica Plain, MA (US); Howard Benjamin Nager, Arlington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 445 days.

(21) Appl. No.: 13/249,061

(22) Filed: Sep. 29, 2011

(65) Prior Publication Data

US 2012/0321275 A1    Dec. 20, 2012

Related U.S. Application Data

(60) Provisional application No. 61/498,962, filed on Jun. 20, 2011.

(51) Int. Cl.
*H04N 5/775* (2006.01)
*H04N 5/76* (2006.01)
*G11B 27/11* (2006.01)

(52) U.S. Cl.
CPC .................. *H04N 5/76* (2013.01); *G11B 27/11* (2013.01); *H04N 5/775* (2013.01)
USPC ....................................................... 386/230

(58) Field of Classification Search
None
See application file for complete search history.

(56) References Cited

U.S. PATENT DOCUMENTS

2011/0126252 A1*  5/2011  Roberts et al. ................. 725/114
2011/0258545 A1* 10/2011  Hunter .......................... 715/716

* cited by examiner

*Primary Examiner* — William C Vaughn, Jr.
*Assistant Examiner* — Daniel Tekle
(74) *Attorney, Agent, or Firm* — Heikki Einola; Micky Minhas

(57) ABSTRACT

A time-shifted digital content item is played via a playback screen, and an updateable companion timeline associated with the time-shifted digital content item is accessed. The updateable companion timeline includes one or more timeline events, and each timeline event has a trigger time corresponding to a playback time in the time-shifted digital content item. Responsive to reaching a playback time that matches a trigger time of one of the one or more timeline events during playback of the time-shifted digital content item, the timeline event having that trigger time is rendered.

16 Claims, 4 Drawing Sheets

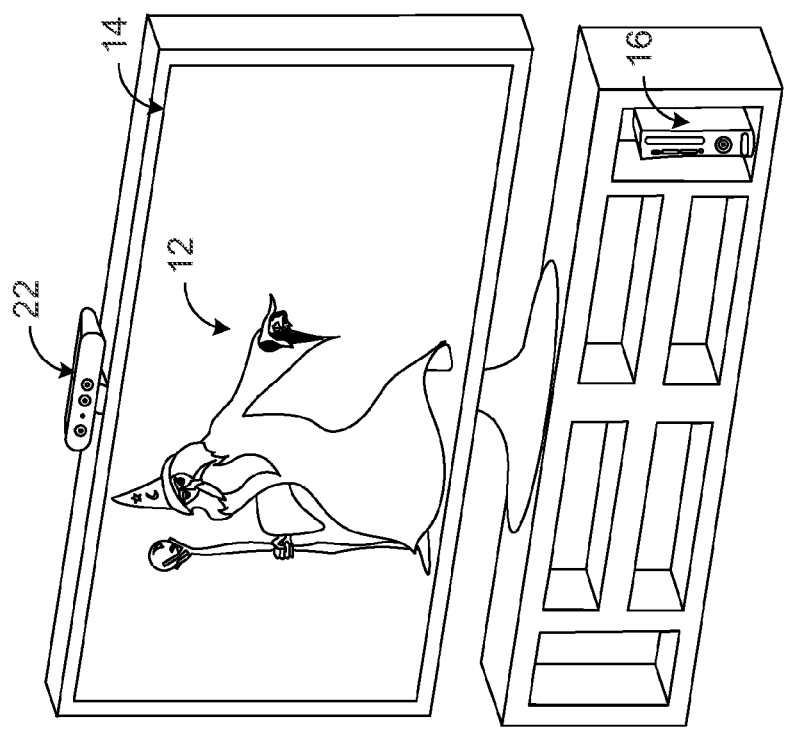
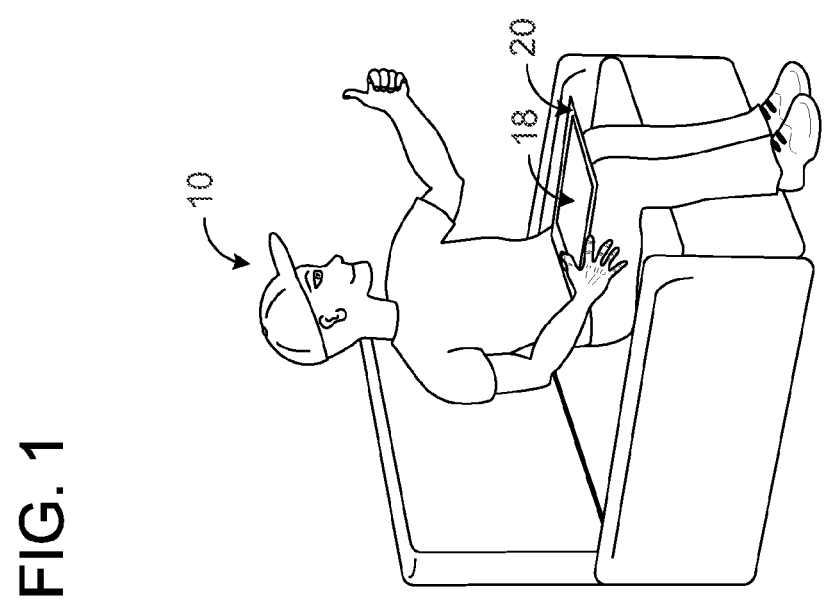
FIG. 1

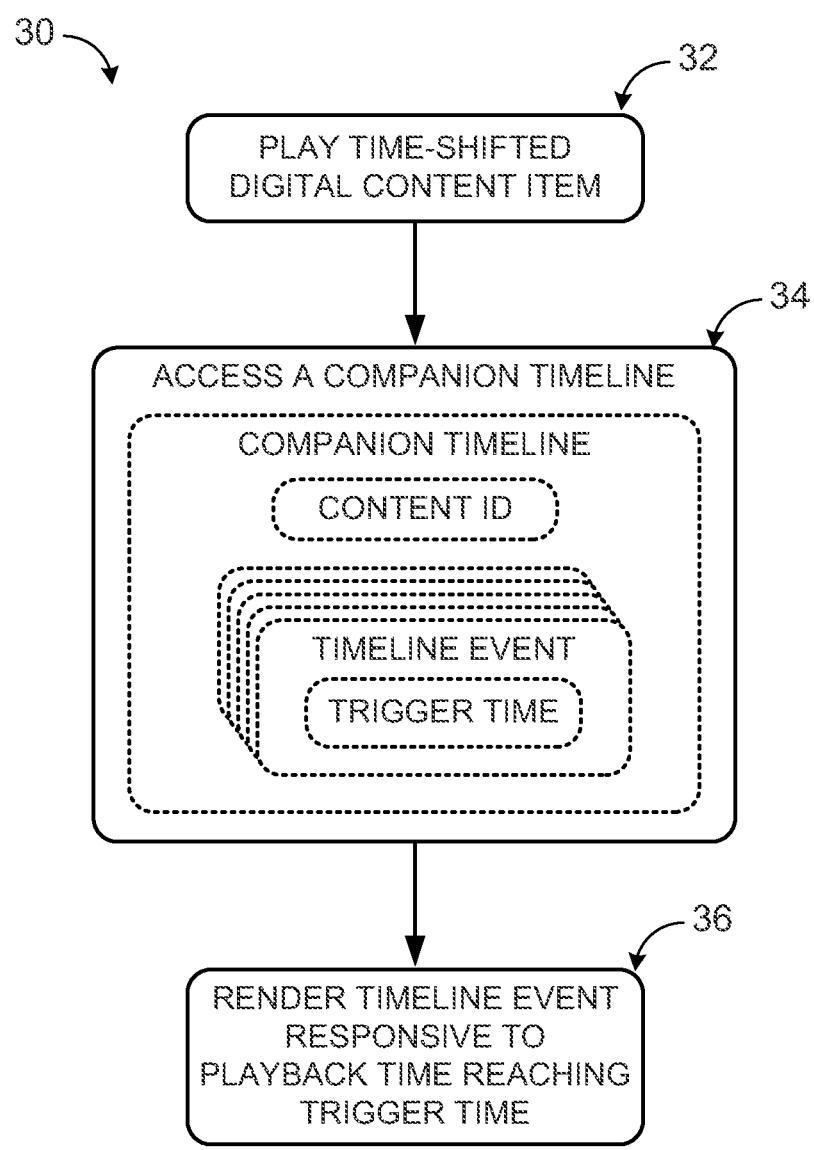

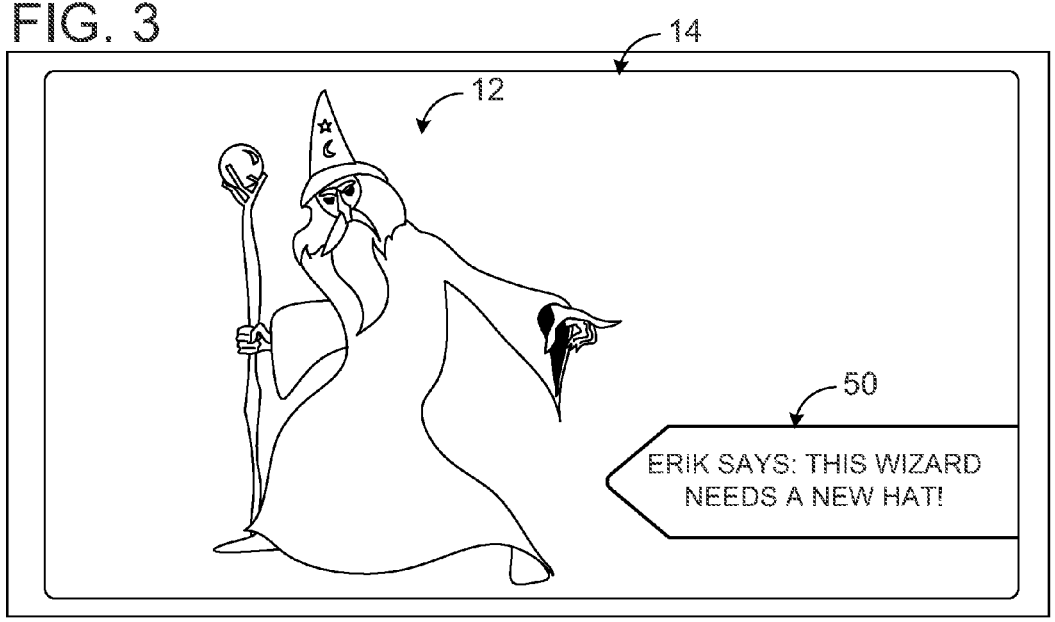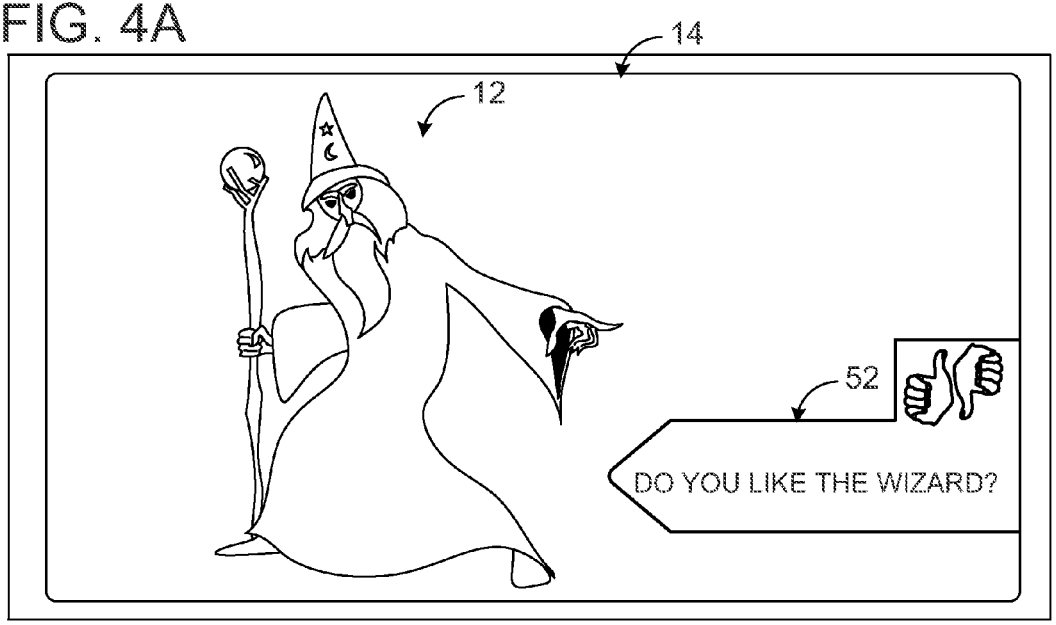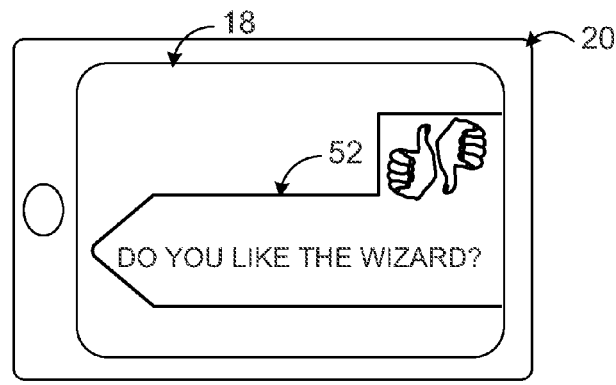

it is US 8,948,567 B2

COMPANION TIMELINE WITH TIMELINE EVENTS

CROSS-REFERENCE TO RELATED APPLICATIONS

This application claims priority to U.S. Provisional Patent Application No. 61/498,962, filed Jun. 20, 2011 and entitled "Companion Timeline with Timeline Events," the entirety of which is hereby incorporated by reference.

BACKGROUND

Media content is frequently time-shifted so that a viewer is able to watch the content at a time that is convenient for that viewer. Instead of watching a sporting event or a new television show live, the viewer is instead able to delay playback to a more convenient time. However, when a viewer decides to postpone event playback, the viewer runs the risk of learning about the event outcome before the viewer experiences the time-shifted event firsthand. This can spoil the event, thus decreasing the viewer's overall enjoyment. Furthermore, when watching a time-shifted event, a viewer may miss out on complimentary activities (social interaction, polls and trivia challenges, etc.) that happen in real-time from associated media such as web-sites.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A companion timeline includes one or more timeline events, and each such timeline event includes a trigger time. When a playback time of a time-shifted digital content item reaches the trigger time of a timeline event, that timeline event is rendered.

BRIEF DESCRIPTION OF THE DRAWINGS

FIG. 1 shows a viewing environment in accordance with an embodiment of the present disclosure.

FIG. 2 shows a method of implementing timeline events.

FIG. 3 shows a playback screen rendering a timeline event with a time-shifted digital content item.

FIG. 4A shows a playback screen rendering another timeline event with a time-shifted digital content item.

FIG. 4B shows a companion screen rendering a timeline event.

DETAILED DESCRIPTION

Figure 5:
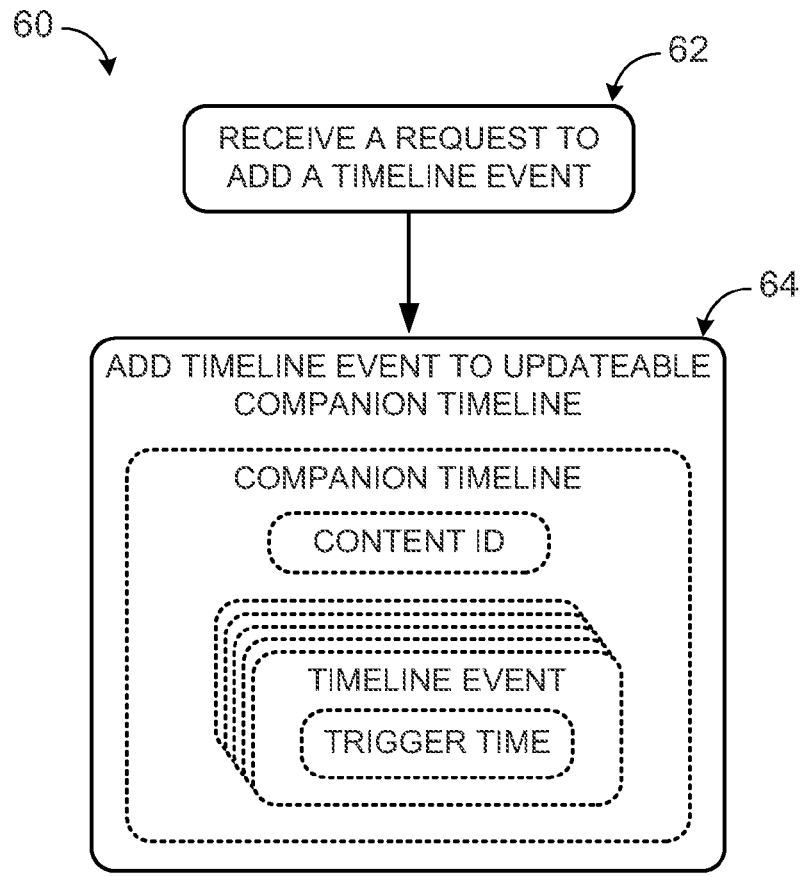
FIG. 5 shows a method of adding timeline events.

FIG. 1 shows a viewer 10 watching a time-shifted digital content item 12 on a playback screen 14. As used herein, "time-shifted" refers to any recorded content that may be viewed after the content is first available for viewing. Time-shifted digital content may include locally saved content, such as movies and/or television programs recorded by a digital video recorder. Additionally or alternatively, time-shifted digital content may include remotely saved content, such as on-demand programs accessed from a remote server. In some embodiments, time-shifted digital content may include digital content that is saved on removable media, such as an optical disc. While the present disclosure is primarily directed to time-shifted digital content, it is to be understood that the timeline events described below may also be rendered in real-time as digital content is played live when it first becomes available.

Time-shifted digital content may be provided to playback screen 14 from a computing device, such as entertainment computing device 16. Entertainment computing device 16 and/or one or more other computing devices may be configured to display locally and/or remotely saved time-shifted content via playback screen 14. It is to be understood that a variety of different computing devices may be used to play the time-shifted digital content, and entertainment computing device 16 is provided as one nonlimiting example. Suitable computing devices include, but are not limited to, media center computers, gaming console computers, on-board television computers, digital video recorders, set-top boxes, and the like. In some embodiments, a mobile computing device such as a mobile telephone or tablet computer may be used to play the time-shifted digital content.

In FIG. 1, viewer 10 is also experiencing information supplemental to the time-shifted digital content item on a companion screen 18 of a mobile device 20. Such a mobile device 20 may wirelessly communicate with an entertainment computing device 16 directly, and/or a mobile device may be configured to receive status updates relating to an entertainment computing device so that supplemental content playback on the companion screen may be synced with playback of the primary time-shifted digital content on the primary playback screen.

The viewing environment illustrated in FIG. 1 is provided as an example viewing environment to explain the timeline events described below. However, it is to be understood that other viewing environments, including mobile viewing environments on a mobile computing device, are within the scope of this disclosure. As such, it is to be understood that the following references to entertainment computing device 16 with playback screen 14 and/or mobile device 20 with companion screen 18 are not limiting. Other single screen and/or plural screen environments are equally within the scope of the present disclosure.

FIG. 2 shows an example method 30 of supplementing time-shifted digital content with timeline events. At 32, method 30 includes playing a time-shifted digital content item. As discussed above with reference to FIG. 1, time-shifted digital content may be played via a playback screen 14 by an entertainment computing device 16, or virtually any other suitable device. The time-shifted digital content may be streamed via a network from a remote server, played from a local mass storage device (e.g., a hard drive), played from removable media (e.g., an optical disc), or played via any other suitable method.

At 34, method 30 includes accessing an updateable companion timeline associated with the time-shifted digital content item. Data used to render the companion timeline may be stored as an XML data file, as a nonlimiting example. In some embodiments, the companion timeline may be accessed via a remotely located server.

The companion timeline may include an identifier, such as a content ID, a video signature, or an audio signature, which can be used to accurately associate the companion timeline with a particular digital content item (e.g., a particular movie, television program, etc.). As such, when entertainment computing device 16 plays a particular time-shifted digital content item, the entertainment computing device may use the identity of that particular time-shifted digital content item to find an appropriate companion timeline that corresponds to that particular time-shifted content item. As one example, the entertainment computing device 16 may send a content ID to a remote timeline server, and the timeline server may send back a companion timeline including the same content ID. In some embodiments, there may be more than one companion timeline that corresponds to a particular time-shifted digital content item, and the entertainment computing device 16 may retrieve one or more such companion timelines, or portions thereof, based on a variety of different filtering criteria (companion timelines associated with certain authors (e.g., friends, producers, etc.), companion timelines that are highly rated, companion timelines that are popular, etc.).

Each updateable companion timeline may include one or more timeline events. As explained by way of example below, a timeline event can be used to provide a viewer with supplemental information that is delivered at an appropriate time so as to avoid spoilers and/or otherwise lessen a viewer's experience. Furthermore, the timeline events enhance the viewer's experience of consuming the event when compared to watching without any supplemental enhancements.

Each timeline event has a trigger time corresponding to a playback time in the time-shifted digital content item. The trigger time of each timeline event allows any particular timeline event to fire at a predetermined time during playback of a time-shifted digital content item, no matter when the time-shifted digital content item is actually viewed. In other words, as shown at 36 of FIG. 2, the timeline event will be rendered responsive to a playback time of the time-shifted digital content item reaching the trigger time of that particular timeline event.

For example, a particular timeline event may have a trigger time equal to 1457 seconds. When the time-shifted digital content item associated with that timeline event is playing, that timeline event will be rendered when the playback time reaches 1457 seconds. In that way, the viewer gets to experience the supplemental information associated with that timeline event at the relative time within the digital-content item that the author of the timeline event intended. As one nonlimiting example, a friend may comment on a particular play in a football game, and the viewer will not see the comment until the viewer watches that particular play. It is worth noting that the viewer still gets to experience the friend's comment, no matter when the viewer actually watches the football game. In this way, even if the viewer watches the game several hours after the friend, the viewer is able to benefit from the friend's commentary without receiving any spoilers that could lessen enjoyment of the game. Furthermore, the friend's comments are delivered to the viewer at the same relative time within the game as when the friend initially provided the comments, thus making the comments very relevant to the viewer's playback experience.

In some embodiments, further provisions may be made to accommodate different viewers viewing the same content at different times. For example, a viewer that sees a timeline event comment from a friend can respond to the friend (for example, disagreeing with a call from the referee), and that friend, who has previously watched the game, may be sent an alert that there is a response to his initial comment. Such messages may be sent directly (e.g., peer to peer) or via a remote server/service (e.g., social network service, timeline service etc.).

The timeline events are extensible so that different types of supplemental information may be provided. Timeline events may include visual and/or audio aspects. For example, a timeline event may include a textual commentary relating to a scene of the digital content item, and/or a timeline event may include an audio commentary relating to a scene of the digital content time. Timeline events may be passive and/or interactive. Passive timeline events may push predetermined supplemental information to the viewer. Active timeline events may allow a viewer to provide information and/or responses (e.g., through polls) that can be used to make the viewer's experience more interactive or augment the supplemental information that is provided to the viewer.

The timeline events may be implemented in a variety of different data formats without departing from the scope of this disclosure. In some embodiments, the timeline events may be implemented as XML encoded data. In other embodiments, the timeline events may be implemented as executable scripts. Other formats may additionally and/or alternatively be used without departing from the scope of this disclosure.

Timeline events may be rendered on playback screens and/or companion screens. In other words, the visual aspects of a timeline event may be visually presented via the playback screen playing the time-shifted digital content item and/or a companion screen that is separate from that playback screen. Such a companion screen may belong to one of a plurality of different mobile devices, each such mobile device simultaneously rendering the timeline event responsive to the playback time of the time-shifted digital content item reaching the trigger time on the playback screen. In this way, different viewers using the same playback screen may use different companion screens to view visual aspects of at least some of the timeline events. Likewise, audio aspects of timeline events may be rendered on shared devices (e.g., surround sound speakers) and/or personal devices (e.g., headphones of mobile device).

As one nonlimiting example, the timeline event may be a friend event providing information from a socially connected friend. As an example, a viewer may be a registered user of one or more online social networks in which the viewer is able to name other registered users as approved "friends." When a viewer is playing a time-shifted digital content item, one or more timeline events created by such friends may be accessed so that the timeline events from those friends can be experienced by the viewer. Each such timeline event may have been tied to a particular trigger time during the friend's previous viewing of the digital content item. As such, each such timeline event can be rendered at the appropriate time when the viewer watches the time-shifted digital content.

FIG. 3 shows an example of a friend event being displayed on playback screen 14 while playing time-shifted digital content item 12. In the illustrated example, the friend event fires a textual commentary 50 from the viewer's socially connected friend, Erik. Even though the viewer is watching the content days after Erik watched the content, the viewer is able to learn what Erik thought of the scene as the viewer watches the scene. Importantly, because the friend event triggers off of the playback time of the time-shifted digital content item 12, the viewer does not experience Erik's commentary about the scene before the viewer reaches the scene. In some embodiments, a viewer's social networking services may include options that allow users to hide time-sensitive spoiler comments from friends until such friends have reached the appropriate playback times in the appropriate content. After the playback times have been reached, the comments may be presented to the viewer simultaneously with the time-shifted content and/or may be unhidden within traditional social networking environments (e.g., a user's message thread).

As another example, the timeline event may be a search event that includes a search trigger. The search trigger may be configured to automatically submit a particular search query to a network accessible search engine. As such, search results may be retrieved from the search engine responsive to the search query. The search results may be presented to the viewer after the playback time reaches the trigger time of that timeline event. In this way, the author of the timeline event can select the search query before the viewer watches the time-shifted digital content item, but the viewer is able to receive search results that are up-to-date at the later time when the viewer watches the content.

The search results may be presented to the viewer in any suitable format. For example, a search query pertaining to a particular actress appearing at a particular playback time may return search results relating to the actress. The results may be automatically formatted so that a picture of the actress is a background to the presented information, with links to relevant pages relating to the actress in the foreground (e.g., the actress's IMDB web page, the site for the actress's most recent movie, and the site to a charity sponsored by the actress).

As still another example, the timeline event may be a voting event. A voting event may allow a viewer to answer a question at a particular playback time. The voting event may also allow a viewer to see a summary of previous viewers' answers to the same question. Furthermore, the viewer's own answer may be included in such a summary when subsequent viewers watch the same content at later times.

In some embodiments, a voting event may include a cue trigger that indicates to a viewer that a viewer response is to be made. As two nonlimiting examples, the cue trigger may indicate to a viewer that a thumbs up or down gesture is to be made, or that a multiple choice selection is to be made. A thumbs up/down indicator may ask a viewer if he likes a particular character featured at that playback time, for example. A multiple choice indicator may ask a viewer to select one of three contestants that the viewer thinks will win a game, for example.

Voting cues may be presented to a viewer on the playback screen while the time-shifted digital content item remains playing. For example, as shown in FIG. 4A, the voting cues 52 may be an overlay to the time-shifted digital content item 12. As shown in FIG. 4B, the voting cues 52 may be presented to a viewer on a companion screen 18 of a mobile device 20.

Viewers may optionally select how many voting events, or other timeline events, they would like to experience. When two or more viewers are present with two different companion devices, the different viewers may choose to receive different numbers of voting events (e.g., one viewer may wish to vote on all possible timeline events, while another viewer wishes to vote on only some timeline events). By presenting the voting cues on the companion screens, the viewer(s) that wish to participate in fewer voting events will not be distracted by other voting cues.

The voting event may also include a response trigger that automatically submits a viewer response to a remote vote aggregator configured to receive responses from a plurality of different viewers watching the time-shifted digital content item at different times.

Viewer responses may be performed in a variety of different manners without departing from the scope of this disclosure. As one nonlimiting example, a viewer's physical gestures may be viewed by a camera, such as 3D depth camera 22 of FIG. 1, so that the physical gestures can serve as responses. In this way, the viewer can physically perform a thumbs up/down gesture as shown in FIG. 1. As another example, a viewer may move a hand to choose a multiple choice selection with an on-screen cursor controlled by the hand movement. As another nonlimiting example, responses may be entered via a mobile device including the companion screen. Responses may be sent via a network, such as the Internet, to the remote vote aggregator.

The remote vote aggregator may be variously configured without departing from the scope of this disclosure. As one example, the remote vote aggregator may be a server configured to receive responses from a plurality of different computing devices at different times as different viewers reach a particular timeline event. The responses may include an event ID so that the aggregator is able to identify the timeline event to which the response corresponds.

The voting event may also include a results trigger that presents a summary of the plurality of responses compiled by the remote vote aggregator from the plurality of different viewers that have already reached the trigger time of the voting event. For example, the response trigger may be configured to receive from the remote vote aggregator a voting summary indicating what percentage of viewers voted thumbs up and what percentage of viewers voted thumbs down at a particular playback time responsive to the cue trigger of the voting event. As another example, the remote vote aggregator may optionally be configured to send a voting summary indicating what percentage of a viewer's friends voted thumbs up/down.

Voting results may be presented to a viewer on the playback screen while the time-shifted digital content item remains playing. For example, the voting results may be an overlay to the digital content, similar to the voting cue shown in FIG. 4A. In some embodiments, the voting results may be presented to a viewer on a companion screen, similar to the voting cue of FIG. 4B.

As another example, the timeline event may be a producer event providing information that supplements content playing as the playback time reaches the trigger time of that timeline event. Producer events may be designed by the creators of the digital content. Producer events may include supplemental information, search triggers, voting triggers, etc. The producer events may be stored as part of an updateable companion timeline, which may be accessed via a remotely located server. As such, timeline events may be added, subtracted, and/or changed after the digital content item is produced and distributed.

FIG. 5 shows an example method 60 for creating a companion timeline. At 62, method 60 includes, receiving a request to add a timeline event. For example, while watching a television program, a viewer may indicate that he wishes to add a comment. The system may be able to recognize a variety of different viewer indications. For example, the viewer may raise a hand so that that a 3D vision system recognizes that the viewer wishes to make a comment. As another example, the viewer may press a button on a companion device. As another example, a producer may use a dedicated application for adding timeline events to a digital content item. Virtually any type of request for adding a timeline event is within the scope of the present disclosure.

At 64, method 60 includes adding the timeline event to an updateable companion timeline associated with the digital content item. As discussed above, a companion timeline may be variously formatted without departing from the scope of this disclosure. The added timeline event will have a trigger time matching a playback time when the request to add the timeline event was received or a playback time that is otherwise specifically indicated, e.g., via a dedicated producer timeline application. In this way, the timeline event can be rendered at the same relative time within a program when the program is subsequently viewed. In other words, the timeline event is configured to be rendered responsive to a playback time of the digital content item reaching the trigger time during subsequent time-shifted playback of the digital content item.

In some embodiments, the above described methods and processes may be tied to a computing system including one or more computers. In particular, the methods and processes described herein may be implemented as a computer application, computer service, computer API, computer library, and/or other computer program product.

Figure 6:
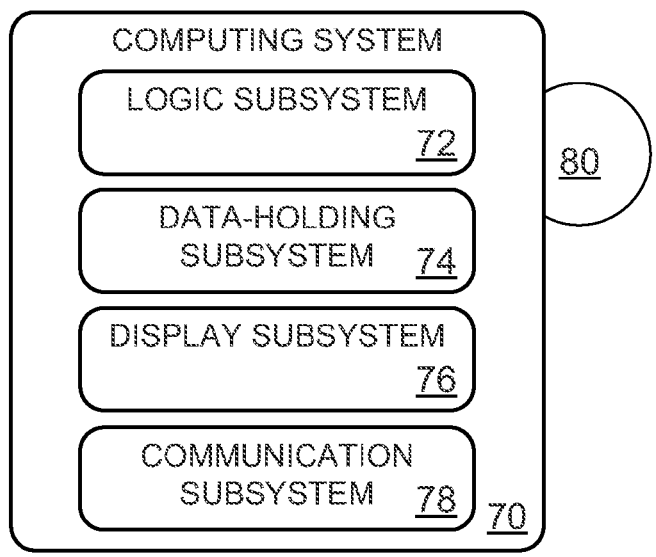
FIG. 6 schematically shows a computing system in accordance with an embodiment of the present disclosure.

FIG. 6 schematically shows a nonlimiting computing system 70 that may perform one or more of the above described methods and processes. Computing system 70 is shown in simplified form. It is to be understood that virtually any computer architecture may be used without departing from the scope of this disclosure. In different embodiments, computing system 70 may take the form of a mainframe computer, server computer, desktop computer, laptop computer, tablet computer, home entertainment computer, network computing device, mobile computing device, mobile communication device, gaming device, etc. Entertainment computing device 16 and mobile device 20 are two nonlimiting examples of computing system 70.

Computing system 70 includes a logic subsystem 72 and a data-holding subsystem 74. Computing system 70 may optionally include a display subsystem 76, communication subsystem 78, and/or other components not shown in FIG. 6. Computing system 70 may also optionally include user input devices such as keyboards, mice, game controllers, cameras, microphones, and/or touch screens, for example.

Logic subsystem 72 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 74 may include one or more physical, non-transitory, devices configured to hold data and/or instructions executable by the logic subsystem to implement the herein described methods and processes. When such methods and processes are implemented, the state of data-holding subsystem 74 may be transformed (e.g., to hold different data).

Data-holding subsystem 74 may include removable media and/or built-in devices. Data-holding subsystem 74 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 74 may include devices with one or more of the following characteristics: volatile, nonvolatile, dynamic, static, read/write, read-only, random access, sequential access, location addressable, file addressable, and content addressable. In some embodiments, logic subsystem 72 and data-holding subsystem 74 may be integrated into one or more common devices, such as an application specific integrated circuit or a system on a chip.

FIG. 6 also shows an aspect of the data-holding subsystem in the form of removable computer-readable storage media 80, which may be used to store and/or transfer data and/or instructions executable to implement the herein described methods and processes. Removable computer-readable storage media 80 may take the form of CDs, DVDs, HD-DVDs, Blu-Ray Discs, EEPROMs, and/or floppy disks, among others.

It is to be appreciated that data-holding subsystem 74 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, display subsystem 76 may be used to present a visual representation of data held by data-holding subsystem 74. As the herein described methods and processes change the data held by the data-holding subsystem, and thus transform the state of the data-holding subsystem, the state of display subsystem 76 may likewise be transformed to visually represent changes in the underlying data. Display subsystem 76 may include one or more display devices utilizing virtually any type of technology. Such display devices may be combined with logic subsystem 72 and/or data-holding subsystem 74 in a shared enclosure, or such display devices may be peripheral display devices.

When included, communication subsystem 78 may be configured to communicatively couple computing system 70 with one or more other computing devices. Communication subsystem 78 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 70 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data-holding device holding instructions executable by a logic machine to:
   play a time-shifted digital content item via a playback screen;
   access an updateable companion timeline associated with the time-shifted digital content item, the updateable companion timeline supporting one or more timeline events including a social network commentary timeline event, the social network commentary timeline event including commentary from a social network connection and having a trigger time corresponding to a playback time in the time-shifted digital content item; and
   responsive to reaching a playback time that matches the trigger time of the social network commentary timeline event during playback of the time-shifted digital content item, render the commentary from the social network connection.

2. The data-holding device of claim 1, where the updateable companion timeline is accessed via a remotely located server.

3. The data-holding device of claim 1, where the one or more timeline events includes a search event with a search trigger that automatically submits a search query to a network accessible search engine, so that search results retrieved responsive to the search query are presented after the playback time reaches the trigger time of the search event.

4. The data-holding subsystem of claim 1, where the one or more timeline events include a producer event from a creator of the time-shifted digital content item, the producer event providing information that supplements content playing as the playback time reaches a trigger time of the producer event.

5. The data-holding device of claim 1, where rendering the timeline event corresponding to the trigger time includes presenting information relating to the timeline event via the playback screen.

6. The data-holding device of claim 1, where rendering the timeline event corresponding to the trigger time includes presenting information relating to the timeline event via a companion screen separate from the playback screen playing the time-shifted digital content item.

7. The data-holding subsystem of claim 1, where the one or more timeline events includes a voting event that includes a response trigger that automatically submits a viewer response to a remote vote aggregator configured to receive responses from a plurality of different viewers watching the time-shifted digital content item at different times.

8. The data-holding device of claim 7, where the voting event further includes a results trigger that presents a summary of a plurality of responses compiled by the remote vote aggregator from the plurality of different viewers that have already reached a trigger time of the voting event.

9. The data-holding device of claim 7, where the voting event further includes a cue trigger that indicates to a viewer that a viewer response is to be made.

10. The data-holding device of claim 9, where the cue trigger indicates to the viewer that a thumbs up or down gesture is to be made.

11. The data-holding device of claim 9, where the cue trigger indicates to the viewer that a multiple choice selection is to be made.

12. The data-holding device of claim 7, where the voting event further includes a results trigger that presents on a companion screen a summary of the plurality of responses compiled by the remote vote aggregator from the plurality of different viewers that have already reached the trigger time of the voting event.

13. A data-holding device holding instructions executable by a logic machine to:
   access an updateable companion timeline associated with a time-shifted digital content item, the updateable companion timeline supporting one or more timeline events including a social network commentary timeline event, the social network commentary timeline event including commentary from a social network connection and having a trigger time corresponding to a playback time in the time-shifted digital content item;
   responsive to reaching a playback time that matches the trigger time of the social network commentary timeline event during playback of the time-shifted digital content item, render the commentary from the social network connection on a companion screen separate from a playback screen playing the time-shifted digital content item.

14. The data-holding device of claim 13, where the companion screen belongs to a mobile device configured to render the timeline event on the playback screen responsive to the playback time of the time-shifted digital content item reaching the trigger time.

15. The data-holding device of claim 13, where the updateable companion timeline is accessed via a remotely located server.

16. The data-holding device of claim 13, where the one or more timeline events includes a search event with a search trigger that automatically submits a search query to a network accessible search engine, so that search results retrieved responsive to the search query are presented after the playback time reaches the trigger time of the search event.

* * * * *